United States Patent

[11] 3,597,629

[72] Inventor Peter G. Bartlett
Davenport, Iowa
[21] Appl. No. 812,940
[22] Filed Aug. 20, 1968
[45] Patented Aug. 3, 1971
[73] Assignee Gulf & Western Industries
New York, N.Y.

[54] TEMPORARY MEMORY RESTORE CIRCUIT FOR MULTIVIBRATOR
12 Claims, 3 Drawing Figs.

[52] U.S. Cl. .......... 307/238, 307/247, 307/291, 307/292, 328/206
[51] Int. Cl. .......... G11c11/34, H03k 3/26
[50] Field of Search .......... 307/238, 246, 247, 289, 291, 292; 328/206

[56] References Cited
UNITED STATES PATENTS

| | | | |
|---|---|---|---|
| 3,510,689 | 5/1970 | Baker .......... | 307/238 |
| 2,982,870 | 5/1961 | Hilbiber .......... | 307/292 X |

*Primary Examiner*—Stanley D. Miller, Jr.
*Attorney*—Meyer, Tilberry and Body

ABSTRACT: There is provided a temporary memory restore circuit for actuating a bistable multivibrator to its last stable state prior to removal of power, when power is returned to the circuit. The memory restore circuit includes a storage capacitor, which is connected across the output of the bistable multivibrator. The capacitor monitors the operation of the multivibrator and is charged in accordance with the last stable state of the multivibrator. Connected in series with the storage capacitor is a normally open circuit means for connecting the capacitor across the output circuit of the bistable multivibrator when power is applied to the circuit, and for disconnecting the capacitor from the circuit when power is removed.

INVENTOR.
PETER G. BARTLETT
BY
Meyer, Tilberry & Body
ATTORNEYS

TEMPORARY MEMORY RESTORE CIRCUIT FOR MULTIVIBRATOR

DISCLOSURE

This invention is directed toward the art of circuits for restoring a multivibrator to the last stable state, and, more particularly, to temporary memory restore circuits incorporating a storage capacitor for restoring a multivibrator to its last stable state when electrical power for providing bias potentials for the multivibrator has been removed, and is then reapplied.

The invention is particularly applicable to bistable multivibrators and will be described with particular reference thereto, although it will be appreciated that the invention has broader applications and may, for example, be used with various bistable circuits such as binary counters, shift registers, etc.

Bistable multivibrator circuits, sometimes known as flip-flops, are well known in the art of electronics. These circuits, for example, include two electronic control devices, such as transistors, of which one is conductive and the other is nonconductive during each stable state of operation. So long as power to supply bias potentials is applied to the multivibrator circuit, the conductivity of the two transistors alternates from one to the other in response to successive trigger pulses applied to the circuit. Usually, the output is taken from the last transistor as either a binary "1" or a binary "0" signal depending on the type of transistor employed, and whether it is conductive or nonconductive. So long as power to supply bias potentials is applied to the multivibrator circuit, the conductivity of the two transistors alternates from one to the other in response to successive trigger pulses applied to the circuit. So long as the bias potentials are applied, the circuit remains in its last stable state awaiting another trigger pulse. But, when power supplying the bias potential is removed, both transistors revert to their nonconducting conditions. Thereafter when power is reapplied, one or the other of the two transistors will commence to conduct, forcing the other transistor to be nonconductive. Which transistor conducts first is usually an unstable and unpredictable parameter as it depends upon such factors as the construction and electrical tolerances of the various circuit elements. Accordingly, once power is reapplied, the circuit will not necessarily return to its last stable state.

The U. S. Pat. to P. J. DeFries 3, 155,933 proposes a permanent memory for a bistable multivibrator circuit wherein the permanent memory includes a saturating ferroelectric capacitor connected between the collectors of the two transistors constituting the multivibrator circuit. In this manner, the polarity of the charge on the ferroelectric capacitor depends upon which transistor is conducting. In the event of power failure or interruptions, the ferroelectric capacitor retains a permanent polarization so that when power is restored, the capacitor serves to bias into conduction the transistor which was last conducting. One problem with such a circuit is that the ferroelectric capacitor is relatively expensive in relation to the more commonly used storage capacitors. Another problem with such a circuit is that a permanent memory device must be employed in the circuit, i.e. a memory device which is able to permanently retain a remanent charge in the event power is removed from the circuit.

The present invention contemplates a new and improved temporary memory restore circuit which overcomes all of the above referred to problems, and others, and provides a circuit which is very economical and simple in construction.

In accordance with the present invention there is provided a bistable multivibrator circuit including a pair of electronic control devices, a storage capacitor being connected across the output of the electronic control devices, normally open circuit means connected in series with the capacitor; and actuatable means, such as a relay or a transistor, for connecting the capacitor across the output of the control devices when power is applied to the circuit, and for disconnecting the capacitor from the circuit when power is removed.

In accordance with another aspect of the present invention, a resistive element is connected in series with the first circuit means, and a second circuit means is connected in series with the capacitor across the output of the electronic control devices. The second circuit means disconnects the storage capacitor from the output circuit upon removal of power, and momentarily connects the capacitor across the output when power is reapplied to the circuit.

The primary object of the present invention is to provide a simple and inexpensive temporary memory restore circuit which returns a bistable circuit to its last stable state prior to the loss of power.

A still further object of the present invention is to provide a temporary memory restore circuit utilizing a storage capacitor which has nonremanent polarization after a given time upon removal of power.

A still further object of the present invention is to provide a temporary memory restore circuit incorporating circuitry for removing the storage capacitor from the circuit upon loss of power, and for reconnecting the capacitor across the circuit when power is returned to the circuit.

A still further object of the present invention is to provide a temporary memory restore circuit in which the storage capacitor is disconnected from the circuit upon removal of power, momentarily connected directly across the output of a bistable circuit when power is returned, and connected in series with a resistive element across the output under normal operating conditions.

The foregoing objects and other advantages of the invention will become more readily apparent from the following description of the preferred embodiments as illustrated in the accompanying drawings wherein.

Figure 1:
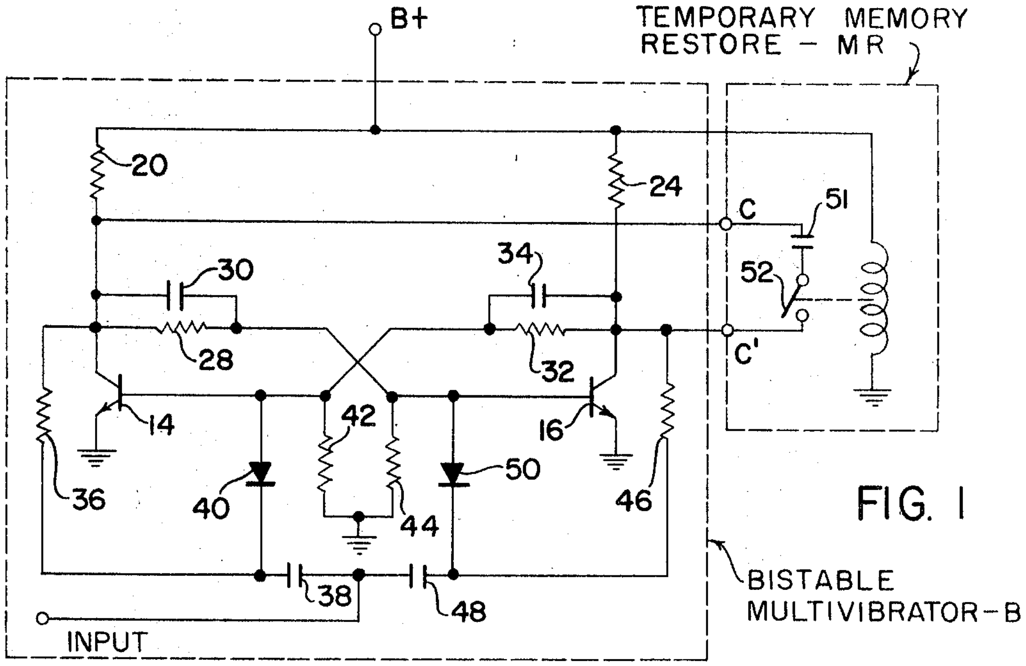
FIG. 1 is a schematic illustration of the temporary memory restore circuit constructed in accordance with the present invention.

Reference is now made to FIG. 1, which schematically illustrates a bistable multivibrator B, and a temporary memory restore circuit MR. The bistable multivibrator B includes a pair of NPN transistors 14 and 16, having their emitters connected in common to ground. The collector of transistor 14 is connected through a resistor 20 to a B+ voltage supply source and through a resistor 28 connected in parallel with a capacitor 30, to the base of transistor 16. Similarly the collector of transistor 16 is connected through a resistor 24 to the B+ supply source, and through a resistor 32 connected in parallel with a capacitor 34, to the base of transistor 14. The collector of transistor 14 is also connected through a resistor 36 and a capacitor 38 to the input of the multivibrator circuit. Similarly, the collector of transistor 16 is connected through a resistor 46 and a capacitor 48 to the input of the multivibrator circuit. A diode 40, poled as shown in FIG. 1, is connected between the base of transistor 14, and the junction of resistor 36 and capacitor 38. Also, the base of transistor 14 is connected through a resistor 42 to ground. Similarly, a diode 50, poled as shown in FIG. 1, is connected between the base of transistor 16 and the junction of resistor 46 and capacitor 48. Also, the base of transistor 16 is connected through a resistor 44 to ground. The collectors of transistors 14 and 16 provide the output terminals C, C', respectively, of the bistable multivibrator circuit.

The temporary memory restore circuit MR, as shown in FIG. 1, includes a storage capacitor 51 connected in series with the contacts of a normally open relay 52, and both of these elements are connected across terminals C, C' of the bistable multivibrator B. One terminal of the actuating coil of relay 52 is connected to the B+ supply source and the other terminal is connected to ground.

Capacitor 51 is a storage capacitor of conventional design, and is of the type which will charge when a direct current voltage of a given polarity is applied to the terminals thereof, will temporarily develop a direct current voltage output signal of a polarity in accordance with its state of polarization, and will completely discharge after a given period of time. In other words, capacitor 15, upon being charged with a signal of a given polarity, will temporarily retain a polarization in accordance with the state of the applied signal; however, since the capacitor is of nonremanent polarization, it will completely discharge after a given period of time.

OPERATION

The operation of the bistable multivibrator B is well known to those skilled in the art. Briefly, either transistor 14, or transistor 16, but not both, is conductive during a stable state of operation. This condition alternates between the two transistors upon receipt of successive trigger pulses at the input terminal. Thus, for example, when the B+ potential is applied, it may be assumed that transistor 14 is conductive and transistor 16 is nonconductive. During such a stable state the potential at the collector of transistor 14 is substantially that of ground potential, and the potential at the collector transistor 16 is substantially that of the B+ voltage supply source. Thereafter, upon receipt of a trigger pulse, transistor 14 becomes nonconductive and transistor 16 become conductive. Therefore, in this state, the potential on the collector of transistor 14 will approach that of the B+ voltage supply source, and the potential on the collector of transistor 16 will approach that of ground potential. The last stable state of the multivibrator circuit will remain so long as the B+ bias potential is applied; however, if for some reason there is a loss of power, all transistors revert to their nonconductive condition. When power is reapplied, one or the other of the two transistors will become conductive, forcing the other to become nonconductive. Which transistor becomes conductive first is an unstable and usually unpredictable parameter, and hence, the circuit will not necessarily return to its last stable state.

In accordance with the present invention, in the normal operating mode with the B+ voltage supply source applied to the circuit, the bistable multivibrator B will assume a stable state, i.e. either transistor 14 or transistor 16 will be conductive. Upon application of the B+ supply source, normally open relay 52 will close, thereby connecting capacitor 51 across terminals C, C′. Assuming transistor 14 is conductive and transistor 16 is non conductive, output terminal C will be at approximately ground potential, and terminal C′ will be at approximately the potential of the B+ supply voltage. In this stable state, capacitor 50 will charge to a voltage approximately that of the B+ supply source, and the lower terminal of capacitor 51, as shown in FIG. 1, will assume a positive potential with respect to the upper terminal. Similarly, assuming the bistable multivibrator is in the other stable state, i.e. transistor 16 is conductive and transistor 14 is nonconductive, capacitor 51 will charge such that the upper terminal will become positive with respect to the lower terminal.

If the last stable state prior to loss of power of the bistable multivibrator B was that in which transistor 14 was conductive, then capacitor 51 would store a charge in which the lower terminal of the capacitor would be positive with respect to the upper terminal. Upon loss of the B+ source supply, the coil of normally open relay 52 will become deenergized and the contacts of relay 52 will open, thereby preventing capacitor 51 from discharging through the bistable multivibrator B. If the memory restore circuit MR were not provided with normally open relay 52, upon loss of power, capacitor 51 would discharge rapidly through a series path containing resistors 20 and 24.

Storage capacitor 51, being charged to a voltage substantially equal to that of the B+ supply source, will temporarily retain a charge in accordance with the last stable state of the multivibrator until the capacitor discharges through its internal resistance. When power is restored to the circuit, the coil of relay 52 will be energized, thereby again connecting capacitor 51 directly across the output terminals C, C′ of the bistable multivibrator B. Assuming capacitor 51 has not completely discharged prior to the time that power is restored to the circuit, the positive voltage on the lower terminal of capacitor 51 will be applied to the base of transistor 14 which will tend to forward bias this transistor and force the transistor into a conductive condition. The negative potential appearing on the upper terminal of capacitor 51 will be applied to the base of transistor thereby forcing this transistor into a nonconductive condition. Through the regenerative effect of the bistable multivibrator B, as transistor 14 becomes more conductive, the collector of this transistor will assume a potential approximately that of ground potential, which will in turn be applied to the base of transistor 16, thereby reverse biasing this transistor. With transistor 14 forward biased and transistor 16 reverse biased, the bistable multivibrator B will be restored to the last stable state prior to the loss of power.

SECOND EMBODIMENT

Figure 2:
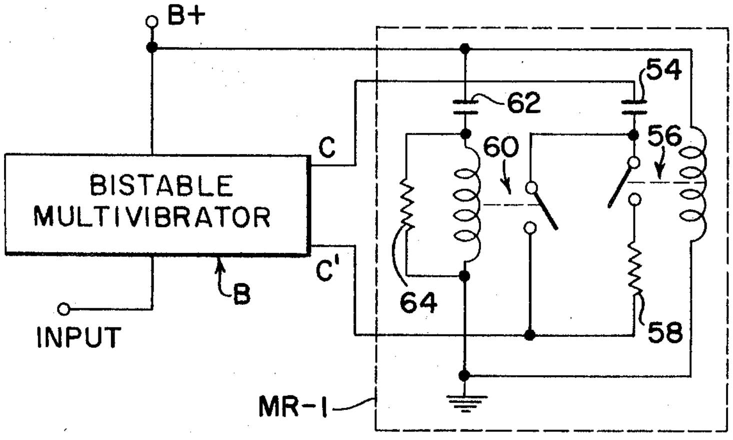
FIG. 2 is a schematic illustration of a second embodiment of the temporary memory restore circuit.

Reference is now made to FIG. 2, wherein the bistable multivibrator B is of the type shown in FIG. 1, and output terminals C, C′ of FIG. 2 correspond to those output terminals in FIG. 1. The temporary memory restore circuit MR–1 includes a storage capacitor 54, contacts of a normally open relay 56, and a resistor 58 all connected in series across the output terminals C, C′ of the bistable multivibrator B. As in the circuit of FIG. 1, the coil of relay 56 is connected between the B+ source voltage and ground. The contacts of normally open relay 60 are connected between the junction of capacitor 54 and the contacts of relay 56, and output terminal C′. One terminal of a capacitor 62 is connected to the B+ source supply, and the other terminal of this capacitor is connected through a resistor 64 which is connected in parallel with the coil of relay 60, to ground.

The operation of memory restore circuit MR–1 is somewhat similar to that of memory restore circuit MR. In the normal operating mode, the coil of normally open relay 56 is energized to thereby close the contacts of the relay so that storage capacitor 54 will charge in accordance with the last stable state of the bistable multivibrator B. The resistor 58 is connected in series with capacitor 54 to limit the charging current of capacitor 54, thereby preventing capacitor 54 from overloading the output of bistable multivibrator B. When the storage capacitor is connected directly across the output terminals of bistable multivibrator B, as is the case in the embodiment of FIG. 1, the multivibrator becomes somewhat sluggish in switching. In order to remedy this condition, resistor 58 is connected in series with capacitor 54, thereby limiting the charging current of capacitor 54. Normally open relay 60, which momentarily closes upon application of power and then reopens, will be open during the normal mode of operation.

Upon loss of the B+ source supply, the normally open relay 60 will remain open, and the coil of relay 56 will become deenergized thereby opening the contacts of this relay. Since the contacts of relays 56 and 60 will be open when power is removed from the circuit, capacitor 54 will be completely disconnected from the circuit to prevent the capacitor from discharging through the bistable multivibrator circuit B. When power is restored to the circuit, normally open relay 60 will momentarily close to connect capacitor 54 directly across the output of bistable multivibrator B. Capacitor 62 will then begin to charge, and upon becoming fully charged will prevent current from flowing through the coil of relay 60, which in turn will cause the contacts of the relay to reopen. Also, when power is restored, the contacts of relay 56 will close and remain closed during the normal operating mode as described above.

THIRD EMBODIMENT

Figure 3:
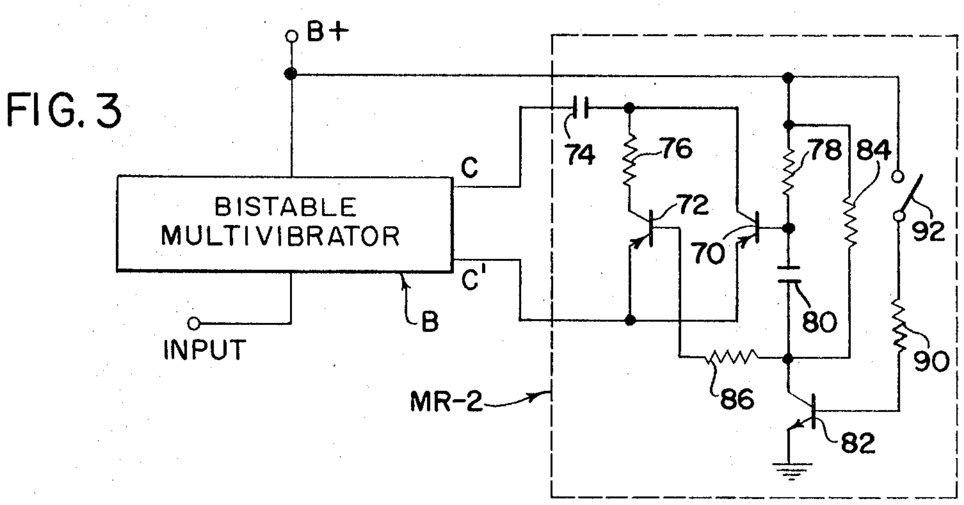
FIG. 3 is a schematic illustration of a third embodiment of the temporary memory restore circuit.

Referring now to FIG. 3, there is illustrated a bistable multivibrator B of the type shown in FIG. 1, and a temporary memory restore circuit MR–2. Memory restore circuit MR–2 is quite similar to memory restore circuit MR–1, except normally open relay 60 has been replaced by a PNP transistor 70, and normally open relay 56 has been replaced by a PNP transistor 72. Memory restore circuit MR–2 includes a storage capacitor 74 connected between the output terminal C of the bistable multivibrator and one terminal of a resistor 76. The other terminal of resistor 76 is connected to the collector of transistor 72, and the emitter of this transistor is connected to terminal C′ of the bistable multivibrator. The collector of transistor 70 is connected to the junction between storage capacitor 74 and resistor 76, and the emitter of this transistor is connected to terminal C′ of the bistable multivibrator B. The B+ source supply is connected through a resistor 78 to one terminal of a capacitor 80, and the other terminal of capacitor 80 is connection to the collector of a NPN transistor 82. The emitter of transistor 82 is connected directly to ground. Connected in parallel with the series combination of resistor 78 and capacitor 80, is a resistor 84. The base of transistor 72 is connected through a resistor 86 to the junction point between capacitor 80, the collector of transistor 82, and resistor 84. Connected to the junction point between resistor 78 and capacitor 80 is the base of transistor 70. The base of transistor 82 is connected through a resistor 90 in series with a switch 92 to the B+ source supply.

The operation of memory restore circuit MR–2 is similar to that of memory restore circuit MR–1 with the exception of transistor 82 and switch 92. In the normal operating mode, with the B+ supply source being applied and switch 92 closed, the B+ supply source will be applied through resistor 90 to the base of transistor 82, thereby forward biasing this transistor. When transistor 82 is forward biased into conduction, the base of transistor 72 will be at approximately ground potential so that this transistor is also forward biased into conduction. During the time transistor 72 is in a conductive state, capacitor 74 will be polarized through resistor 76 in accordance with the last stable state of bistable multivibrator B. Referring to FIGS. 2 and 3, it may be seen that these transistors provide functions similar to normally open relays 60 and 56, respectively, in memory restore circuit MR–1. In the normal operating mode capacitor 80 will become fully charged and provide a reverse bias for transistor 70, thereby preventing storage capacitor 74 from being connected directly across the output terminal C, C′ of the bistable multivibrator B.

Upon loss of the B+ source supply, transistor 70 will remain in a nonconductive state, and since the bias potential applied to the base of transistor 82 is removed, this transistor will also become nonconductive. When transistor 82 becomes nonconductive, the forward bias of transistor 72 is removed so that this transistor also becomes nonconductive. Thus, storage capacitor 74 will be disconnected from the output terminals of the bistable multivibrator B to prevent the discharge of capacitor 74 through this circuit. When power is again restored to the circuit, if switch 92 is closed. transistor 82 will be forward biased into conduction, which in turn will forward bias transistor 72 into conduction. Transistor 70 will be forward biased until capacitor 80 becomes fully charged, at which time transistor 70 will become reverse biased, thereby causing this transistor to become nonconductive. The effect of transistor 70 being momentarily conductive, is that storage capacitor 74 will initially be connected directly across the output terminals C, C′ of the bistable multivibrator B, thereby applying the full potential of capacitor 74 to the output terminals of the multivibrator. In the normal operating mode, however, storage capacitor 74 is disconnected from the circuit which provides a direct connection across terminals C, c′, so as to prevent the above-mentioned sluggish operation of the bistable multivibrator B.

The circuit comprised of switch 92, resistor 90, and transistor 82, provides a means for controlling the time at which the bistable multivibrator B is reset. In the event multivibrator B is employed in series with a plurality of bistable multivibrators, each having a temporary memory restore circuit, it may be desirable to simultaneously reset all of the multivibrators. Once power is restored to the circuits, the control switch or switches may be closed to thereby simultaneously reset the circuits. Alternatively, switch 92 may be replaced with a normally open, time delay relay to automatically reset the circuit upon a preselected time after the power is restored.

Although the invention has been shown in connection with preferred embodiments, it will be readily apparent to those skilled in the art that various changes in form and arrangements of parts may be made to suit requirements without departing from the spirit and scope of the invention as defined by the appended claims.

Having thus described my invention, I claim:

1. A temporary memory restore circuit for a multivibrator circuit having a pair of electronic control devices each including first, second, and control electrodes; said first electrodes being coupled to a first electrical potential; said second electrodes being connected to a second electrical potential; each said first electrode being coupled to the control electrode of said other control device to define a multivibrator circuit so that said two control devices alternate between conductive and nonconductive stable states; the improvement in said memory restore circuit for restoring a said multivibrator circuit to its last stable state after power for at least one of said potentials has been removed and replaced, including:

a storage capacitor having a first and second terminal and being of nonremanent polarization after a given time upon removal of power; said capacitor providing a direct current voltage output signal of a polarity in accordance with its state of polarization and, then substantially discharging after said given time;

a first normally open circuit means for connecting said capacitor across said first electrodes of said electronic control devices; and a first actuatable means for, upon actuation, closing said first normally open circuit means for charging said capacitor in accordance with the last stable state of said multivibrator circuit and for applying said output signal to said multivibrator circuit so that after said power is returned the said multivibrator circuit is actuated to its last stable state.

2. A temporary memory restore circuit as defined in claim 1 including a second normally open circuit means for connecting said capacitor across said first electrodes of said control devices; said first normally open circuit means including a resistive element connected in series with said first circuit means;

a second actuatable means for momentarily closing said second normally open circuit means upon actuation of said second actuatable means.

3. A temporary memory restore circuit as defined in claim 1 wherein said first normally open circuit means includes a first and a second terminal; said first terminal of said circuit means being connected to said first terminal of said capacitor and said second terminal of said circuit means being connected to one of said first electrodes; the other of said electrodes being connected to said second terminal of said capacitor.

4. A temporary memory restore circuit as defined in claim 3 wherein said second terminal of said first circuit means in connected through a resistive element to said one of said first electrodes;

a second normally open circuit means having a first and a second terminal; said first terminal of said second circuit means being connected to said first terminal of said capacitor and said second terminal of said second circuit means being connected to said one of said first electrodes; and a second actuatable means for momentary closing said second normally open circuit means upon actuation of said second actuatable means.

5. A temporary memory restore circuit as defined in claim 4 wherein said first actuatable means includes a relay coil connected between said first and said second electrical potentials; and said second actuatable means includes in a relay coil connected in parallel with a second resistive element and in series with a capacitive element across said first and said second electrical potentials.

6. A temporary memory restore circuit as defined in claim 4 and wherein said first and said second actuatable means include a first and a second electronic control device respectively, each including a control electrode.

7. A temporary memory restore circuit as defined in claim 6 wherein said control electrode of said first actuatable means is connected through a second resistive element to said second electrical potential, and said control electrode of said second actuatable means is connected through a third resistive element to said first electrical potential, and through a second capacitive element to said second electrical potential.

8. A temporary memory restore circuit as defined in claim 7 including a switching means for disconnecting said second potential from said second capacitive element and said second resistive element so that the multivibrator circuit will be actuated to its last stable state upon energization of said switching means.

9. A temporary memory restore circuit as defined in claim 8 wherein said switching means includes a third transistor having a first electrode connected to said second capacitive element and said second resistive element, a second electrode connected to said second electrical potential, and a control electrode coupled to said first electrical potential.

10. A temporary memory restore circuit as defined in claim 9 wherein said control electrode is coupled to said first electrical potential through a third normally open circuit means so that said multivibrator circuit may be actuated to its last stable state upon closure of said third normally open circuit means.

11. A temporary memory restore circuit for a multivibrator circuit having a pair of electronic control devices each including first, second, and control electrodes; first and second electric potential supply terminals for connection to different electric potentials; said first electrodes being connected to said first terminal, said second electrodes being connected to said second terminal; each said first electrode being coupled to the control electrode of said other control device to define a multivibrator circuit so that said two control devices alternate between conductive and nonconductive stable states; the improvement in said memory restore circuit for restoring said multivibrator circuit to its last stable state after power for at least one of said potentials has been removed and replaced, including:

a storage capacitor having a first and second terminal; said capacitor providing a direct current voltage output signal of a polarity in accordance with its state of polarization;

a first normally open circuit means for connecting said capacitor across said first electrodes of said electronic control devices; and a first actuatable means for, upon actuation, closing said first normally open circuit means to connect said capacitor across said first electrodes of said electronic control devices and, upon deactuation, disconnecting said capacitor from across said first electrodes of said electronic control devices for, upon actuation charging said capacitor in accordance with said last stable state of said multivibrator circuit and for applying said output signal to said multivibrator circuit so that, after said power is returned, the said multivibrator circuit is actuated to its last stable state and, upon deactuation, said capacitor is prevented from discharging through said electrodes of said electronic control devices.

12. A circuit as defined in claim 11, wherein said first actuatable means is connected to one of said electrical potential supply terminals, whereby said first actuatable means is actuated only while potential is supplied to said electrical potential supply terminals.